Patented May 26, 1953

2,639,697

UNITED STATES PATENT OFFICE 2,639,697

AIR-COOLED INTERNAL-COMBUSTION ENGINE WITH EXHAUST JET

Douglas K. Warner, Sarasota, Fla.

Application December 13, 1945, Serial No. 634,811

3 Claims. (Cl. 123—55)

The object of this invention is to provide means for cooling a short stroke 2 cycle radial engine capable of providing unusual power in a small size and over an unusually great speed range.

The power required for a centrifugal water pump or a fan increases as the cube of the speed so that an engine which can operate smoothly at 300 R. P. M. and which has its peak power at 30,000 R. P. M. would require a million times as much power to operate the cooling unit at high speed as at low speed. The blowdown energy (or bark of an engine), is capable of cooling the engine at all speeds without introducing any back pressure and, if the gases move from the cylinder thru a proper diffuser, at certain resonant engine speeds the blowdown energy will aid the scavenging of the cylinder as well as effecting all the cooling of the engine and its oil supply. This is particularly valuable in the type of engine shown in this application and in applications Serial Numbers 16,162, filed March 22, 1948, and 67,443, filed December 27, 1948, and Patents 2,310,471 and 2,454,852.

In order to operate an engine over such a wide range of speed it is essential that it operate thru a very large gear reduction at its high speed, if directly connected to its load at low speed, so that a cylindrical planetary gear box is called for and the outside of this box serves as the rigid inner wall of the diffusers for all cylinders.

Figure 1:
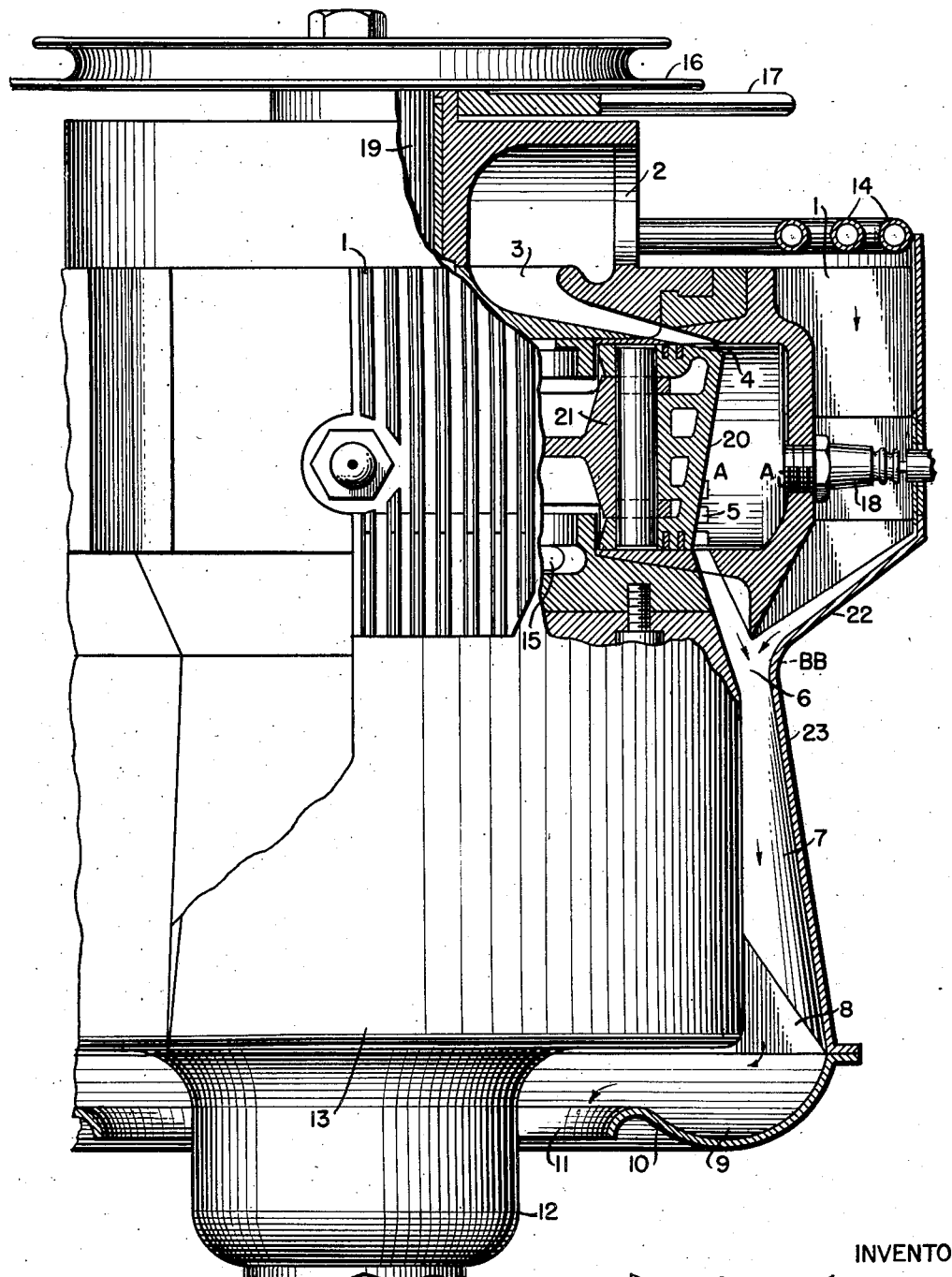

In the drawings Fig. 1 is a cutaway view of the engine with its gear box mounted below it, this being a full scale drawing of an engine more powerful than most automobile engines. The power results from the short stroke and the rotary valve fan of the afore-mentioned patents which holds the inlet ports closed till the blowdown is complete and then has the new charge already in motion at nearly 1000 ft./sec. ready to force the remaining burnt charge across the cylinder after converting that velocity energy back to pressure by diffusion inside the cylinder, as shown in application Serial Number 16,162.

Figure 2:
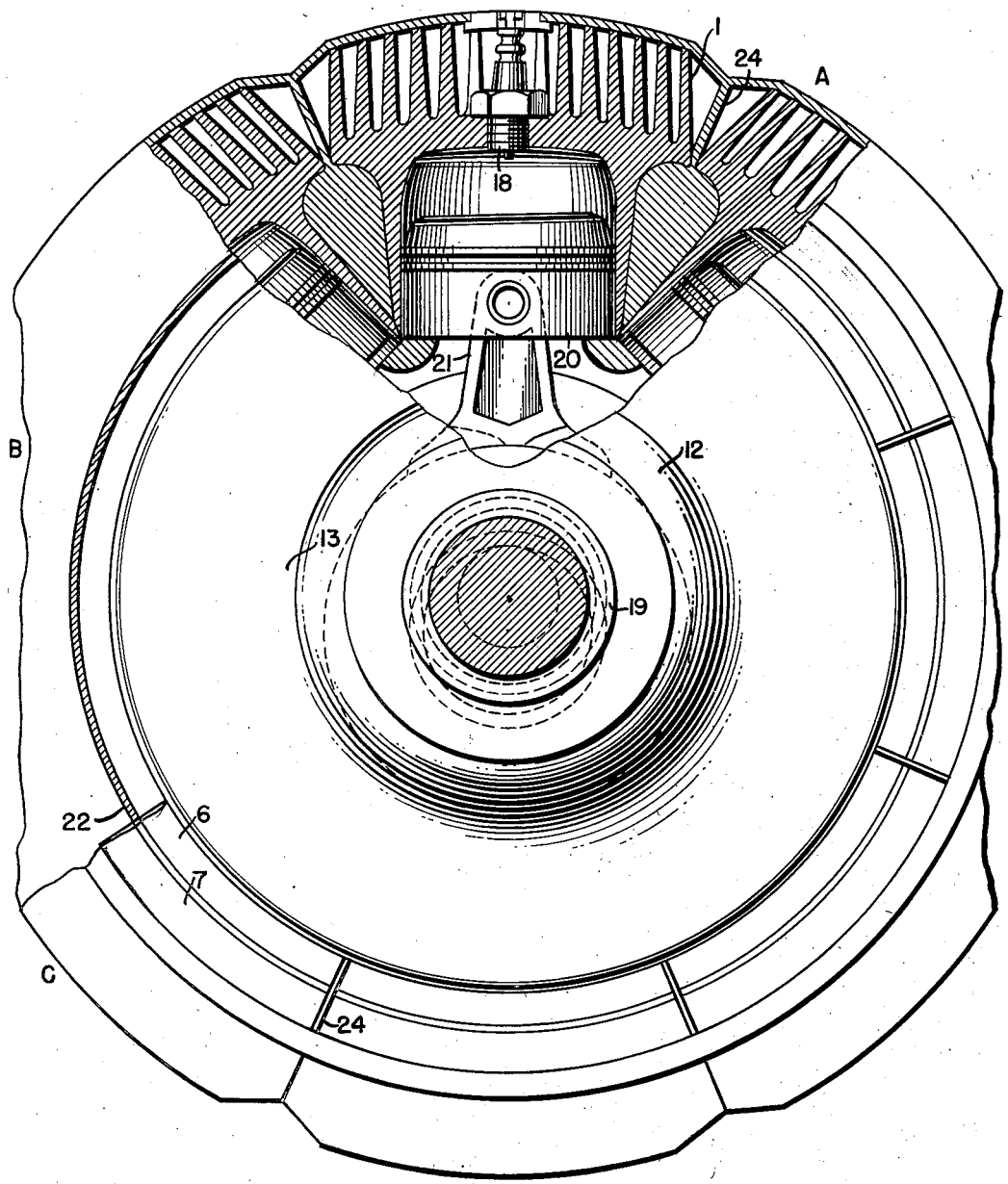

Fig. 2 is a rear end view of engine cut away in the top portion thru AA of Fig. 1 to show the cross section of the cylinder head cooling fins 1.

In Fig. 1 the new charge enters the engine thru opening 2 and is caught in the blades of rotary valve fan 3 entering cylinder thru 4 to force the burnt gas out ports 5 to air ejector throat 6 and diffuser 7 where at 8 the gas from one diffuser starts mixing with that in the adjacent diffuser and at 9 the gases are reversed in dished muffler plate 10 and they are exhausted at 11 in the annular space between the muffler plate and lower extension 12 of gear casing 13.

At throat 6 air is entrained in the exhaust jet and drawn over fins 1 and oil cooling coils 14 which are supplied with oil by pump 15 which is the lower crankshaft counterbalance the upper being the rotary valve fan 3.

The engine is started by a rope in pulley 16 and controlled by spark lever 17 and fired by spark plug 18, a continuous spark being distributed to each cylinder in order of rotation. The crankshaft 19 is driven by piston 20 thru rod 21. The casing 22 surrounds all the fins 1 and partitions 24 divide the air passages between cylinders so that each cylinder's exhaust jet draws the air over its own fins, and the casing is sharply contracted at 6 to permit the jet to entrain the cooling air.

The cylinder heads extend forwardly and rearwardly of said cylinders to provide a base for the extended straight fins 1. The rear end of the rear extensions of all cylinder heads taper to a thin edge encircling crankshaft 19. The cylinders are so short that heat is readily conveyed to these head extensions and the fins which run straight from front to rear, outwardly from said heads.

The inlet ports in the forward wall of the cylinder are relatively higher than in other engines and there is little mixture of old and new gases since the scavenge flow is almost straight across the cylinder. Accordingly, good scavenging is attained in minimum time with less bypassed gas. Conventionally, a scavenge charge enters a cylinder in many small port openings and the old burnt gases are entrained in the jets which attempt to push their way to the top of a cylinder. My arrangement permits pushing the gases across the cylinder without such entrainment and mixing. Partitions 24, mentioned before, separate the cool airflow over each cylinder and each cylinder gets an airflow over its fins proportional to the energy in its exhaust jet and so just the amount of cooling it requires. When exhaust jet and cooling air meet at 6 both move very fast and this velocity energy is used to bring both out against atmospheric pressure in the diffuser 7 with its gradually diverging walls 23 and straight inner wall composed of gear casing 13.

An output shaft casing 12 extends rearward of casing 13 as a lower extension thereof and is of smaller diameter than the main body of the gear casing. The dished muffler plate 10 forms a circular trough spaced from said extension so that the exhaust can swing around the trough where other cylinders are not then barking and pass out thru that spacing.

Having thus fully described my invention what

I claim as new and desire to secure by Letters Patent is:

1. A radial two stroke cycle engine having a bore about three times its stroke, a crankshaft, a single row of cylinders having heads with extensions extended forwardly and rearwardly of said cylinders and said cylinders being grouped about and in a plane perpendicular to said crankshaft, said cylinders being of such dimensions that the heat from the cylinder walls may be readily conveyed to said extensions, fins in said heads and extensions forming straight air passages therebetween, inlet ports in the forward portions of said cylinders and exhaust ports in the opposite portions of said cylinders, a casing surrounding the outer edges of all said cylinder head fins and being contracted at the rear of said fins, partition means between each cylinder extending from the forward extension beyond the contracted portion forming with said contracted portion a passage of reduced cross sectional area, an exhaust passage of approximately cylinder width formed with the side of the rear cylinder head extension and converging with said passage of reduced cross section, a diffusing passage of gradually increasing area beyond the point of convergence and connected to said passage at said point.

2. The engine of claim 1 in combination with a gear casing immediately rearward of said engine said casing forming the inner wall of said diffuser passages.

3. The engine of claim 2 and an output shaft casing below said gear casing of lesser diameter than said main gear casing portion and a circular trough spaced from and surrounding said shaft casing and the outer edge of said trough joined with the outer lower edge of the diffusing passage; wherein the flow of gas and cooling air from all cylinders is joined and reversed and made to follow thru an annular passage between said trough and said output shaft casing.

DOUGLAS K. WARNER.

References Cited in the file of this patent

UNITED STATES PATENTS

| Number | Name | Date |
|---|---|---|
| 657,451 | Rea | Sept. 4, 1900 |
| 1,858,996 | Lesage | May 17, 1932 |
| 1,941,360 | Mathias | Dec. 26, 1933 |
| 2,118,209 | Linthwaite | May 24, 1938 |
| 2,206,418 | Mercier | July 2, 1940 |
| 2,209,996 | Neuland | Aug. 6, 1940 |
| 2,326,224 | Jackson | Aug. 10, 1942 |
| 2,352,793 | Lennes | July 4, 1944 |

OTHER REFERENCES

Serial No. 296,469, Schnetzer (A. P. C.), published May 11, 1943.

Serial No. 326,141, Ramshorn (A. P. C.), published May 11, 1943.